United States Patent [19]
Ohsaki et al.

[11] Patent Number: 5,573,030
[45] Date of Patent: Nov. 12, 1996

[54] STOP VALVE

[75] Inventors: Hiroshi Ohsaki; Shinji Hojo, both of Sashima-gun, Japan

[73] Assignee: Kyosan Denki Co., Ltd., Tokyo, Japan

[21] Appl. No.: 365,304

[22] Filed: Dec. 28, 1994

[30] Foreign Application Priority Data

Dec. 29, 1993 [JP] Japan .................................. 5-353886

[51] Int. Cl.$^6$ ................................................ F16K 17/36
[52] U.S. Cl. ...................................... 137/43; 137/202
[58] Field of Search ........................................ 137/43, 202

[56] References Cited

U.S. PATENT DOCUMENTS

| | | | |
|---|---|---|---|
| 3,768,498 | 10/1973 | Urban | 137/43 |
| 4,487,215 | 12/1984 | Green | 137/43 |
| 4,886,089 | 12/1989 | Gabrlik | 137/202 |
| 5,065,782 | 11/1991 | Szlaga | 137/43 X |
| 5,325,882 | 7/1994 | Forsythe | 137/43 X |

*Primary Examiner*—Stephen M. Hepperle
*Attorney, Agent, or Firm*—Flynn, Thiel, Boutell & Tanis, P.C.

[57] ABSTRACT

A stop valve capable of reducing generation of noise and a valve body can surely close a valve seat even if a float is inclined. The stop valve has a case, a float provided in the case so as to move vertically, wherein a valve seat is closed by a valve body when the float moves upward while the valve seat is open when the float moves downward, a pedestal provided under the case for placing a spherical weight thereon, characterized in that the pedestal has radial slits thereon and the float has radial slits at the bottom wall thereof.

2 Claims, 6 Drawing Sheets

STOP VALVE

BACKGROUND OF THE INVENTION

1. Field of the Invention

The present invention relates to a stop valve, more particularly to breathing system of a fuel tank for an internal combustion engine of an automobile, particularly to an improvement of a float type stop valve.

2. Prior Art

A breathing system is provided in a fuel tank for an internal combustion engine of an automobile for communicating with the atmosphere and a canister is provided in the breathing system for preventing evaporative emission being discharged toward the atmosphere.

If the breathing system is always open to the atmosphere, there is a likelihood that the fuel is leaked outside to bring about a big accident when the automobile (fuel tank) is largely inclined or forced to overturn. To prevent such inclination or overturning of the automobile, a stop valve is provided in the breathing system of the fuel tank for closing the breathing system.

The stop valve is generally used as a float type valve for closing the breathing system of the fuel tank by height of liquid level of the fuel on which the valve floats. In such a float type stop valve, when the automobile overturns, the float floats on the fuel so that the stop valve can not close the breathing system. Accordingly, the float is to be sunk using a weight or spring. When using the spring, a load applied to the float must be set considering the weight and buoyancy of the float, and hence there is a tendency that a weight type stop valve has been recently employed.

A prior art weight type stop valve will be now described with reference to FIG. 10 which is a cross-sectional view thereof.

A top wall of a fuel tank 1 is penetrated to provide a communication passage 2 constituting the breathing system of fuel.

A valve seat 3 and a valve body 4 for closing the valve seat 3 are provided in the communication passage 2. The valve body 4 is provided on a float 5. The float 5 floats on fuel in the fuel tank 1 and is movable vertically depending on surface of fuel, i.e. liquid level of the fuel in the communication passage 2.

A spherical weight 6 is provided under the float 5 for allowing the valve body 4 to weight or urge toward the valve seat 3 when placing on the float 5 when the automobile overturns. The weight 6 is normally placed on a pedestal 7.

The prior art stop valve operates as follows.

The fuel tank 1 communicates with atmosphere through the communication passage 2, a valve port of the valve seat 3 and a canister (not shown).

When the fuel tank 1 is largely inclined, the float 5 floats on the fuel so that the valve body 4 closes the valve seat. As a result, the fuel in the fuel tank 1 is prevented from being leaked outside through the breathing system.

When the automobile overturns, the fuel tank 1 is turned upside down so that the top wall of the fuel tank 1 is positioned at the bottom wall so that the float 5 is liable to float in the direction for the valve body 4 to open the valve seat 3. However, the weight 6 places on the float 5 and the valve body 4 closes the valve seat 3 by the weight of the weight 6. Accordingly, the fuel in the fuel tank 1 is prevented from being leaked outside through the breathing system.

However, there are following drawbacks in the prior art stop valve.

First, since the weight 6 swings in front and rear and left and right so that it strikes against the pedestal 7 or the communication passage 2. At this time, striking or shock sound is leaked outside as noise.

When the float 5 moves upward while it is inclined, there is a likelihood that the valve body 4 insufficiently closes the valve eat 3.

SUMMARY OF THE INVENTION

It is therefore an object of the present invention to improve the drawback of the prior art stop valve and to provide a stop valve capable of reducing the generation of noise and capable of closing the valve seat with assurance by the valve body even when the float is inclined.

To achieve the above objects, the stop valve according to a first aspect of the invention has a case, a float provided in the case so as to move vertically, wherein a valve seat is closed by a valve body when the float moves upward while it is open when the float moves downward, and a pedestal provided under the case for placing a spherical weight thereon, characterized in that the pedestal has radial slits thereon and the float has radial slits at the bottom wall thereof. Further, it is characterized in that thickness of the pedestal is gradually thinned toward a center of the pedestal.

A stop valve according to a second aspect of the invention has a case, a float provided in the case so as to move vertically, wherein a valve seat is closed by a valve body when the float moves upward while it is open when the float moves downward, and a pedestal provided under the case for placing a spherical weight thereon, characterized in that the valve body is provided on the upper surface of the float and the valve seat is provided in the case, wherein the valve body 13 is made of an elastic material and a gap is provided between the valve body and the float. Further, it is characterized in that the valve body is provided on the upper surface of the float and the valve body is made of an elastic deformable material, and wherein a valve port is defined on the valve body which is attached to the case and a gap is provided between the caseand the valve body.

A stop valve according to a third aspect of the invention has a case, a float provided in the case so as to move vertically, wherein a valve seat is closed by a valve body when the float moves upward while it is open when the float moves downward, and a pedestal provided under the case for placing a spherical weight thereon, characterized in that the case is cylindrical and a plurality of slits are provided at the periphery of the case.

With the arrangement of the pedestal and float having slits thereon, the shock caused by the striking of the weight against the pedestal or float is mitigated by these slits, thereby reducing the noise caused by the striking or shock sound.

With the arrangement of the valve body having the gap at the rear side thereof, the valve can be elastically deformed in the range of the gap, there does not occur the insufficient closing of the valve seat by the valve body even if the float is inclined and raised by the length of the gap.

Further, since the evaporative emission flows through the slits provided in the case, the fuel is prevented from being sprayed.

BRIEF DESCRIPTION OF THE DRAWINGS

FIGS. 7(A) to 7(C) are views showing operations of stop valve of FIG. 1, wherein FIG. 7(A) shows a normal state, FIG. 7(B) shows a fuel tank when is inclined and FIG. 7(C) shows the fuel tank when it overturns;

PREFERRED EMBODIMENT OF THE INVENTION

First Embodiment (FIGS. 1 to 8)

A stop valve according to a preferred embodiment of the invention will be described with reference to FIGS. 1 to 8.

Figure 1:
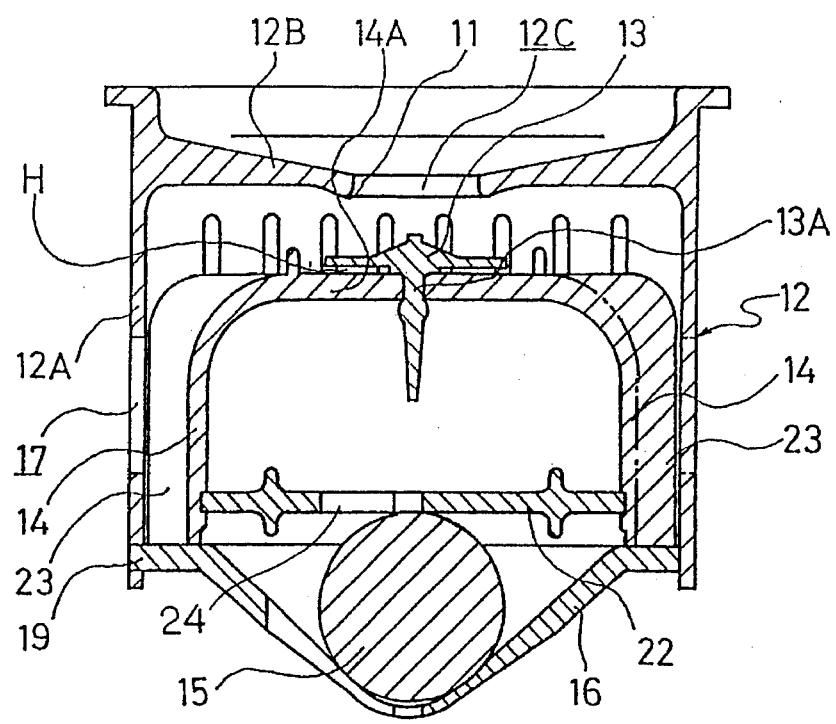
FIG. 1 is a cross-sectional view of a stop valve according to a first embodiment of the invention.
Figure 2:
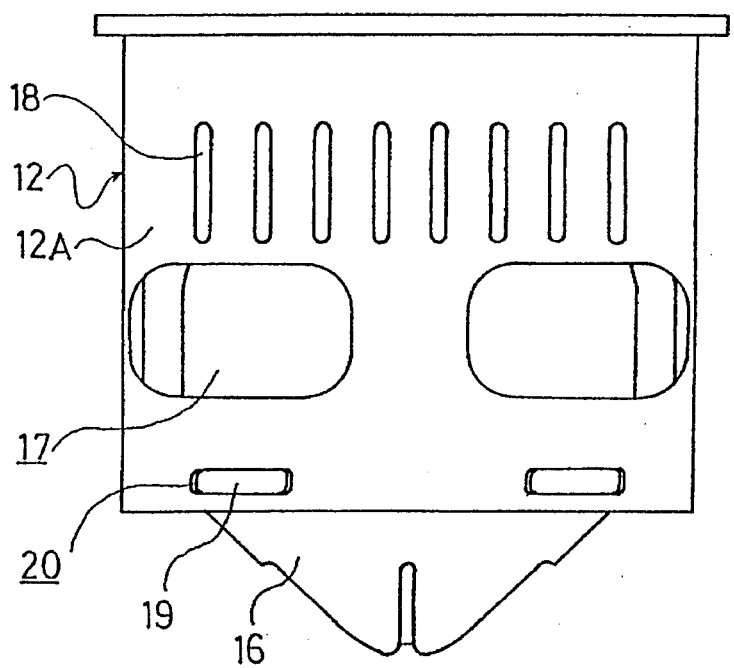
FIG. 2 is a front view of the stop valve of FIG. 1.
Figure 3:
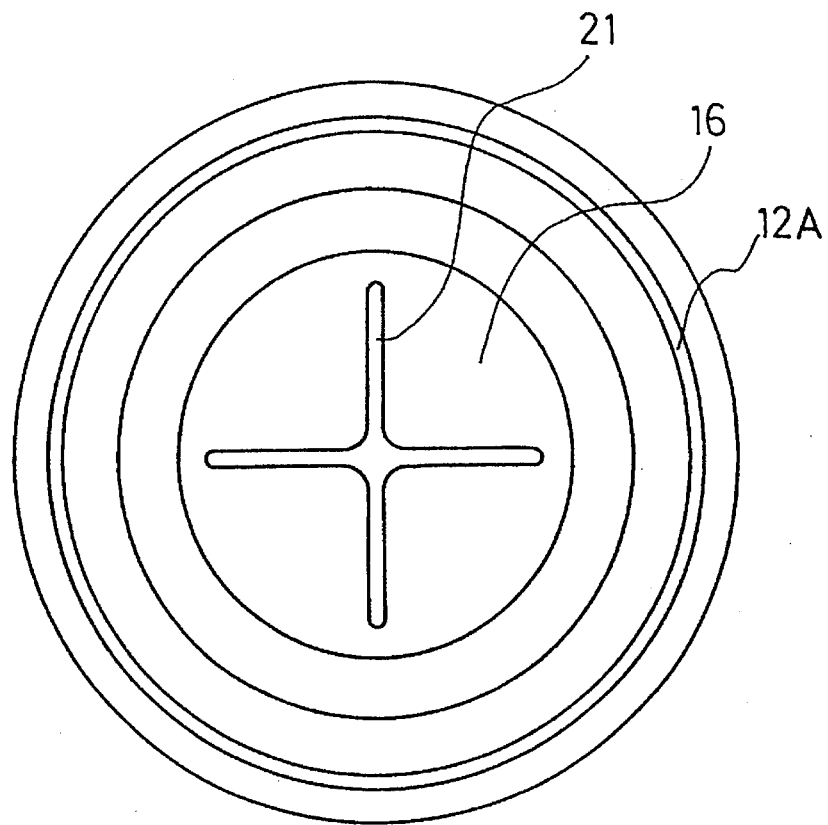
FIG. 3 is a bottom view of the stop valve of FIG. 1.
Figure 4:
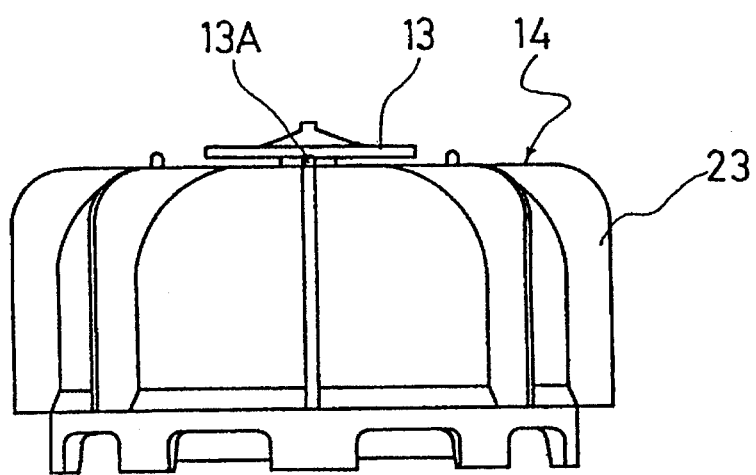
FIG. 4 is a front view of a float of the stop valve of FIG. 1.
Figure 5:
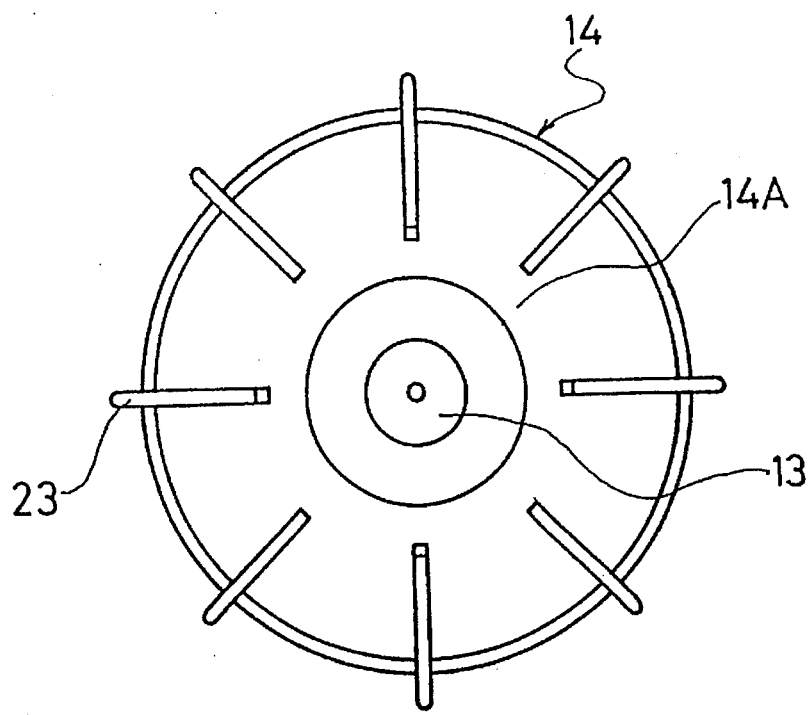
FIG. 5 is a plan view of the float of FIG. 4.
Figure 6:
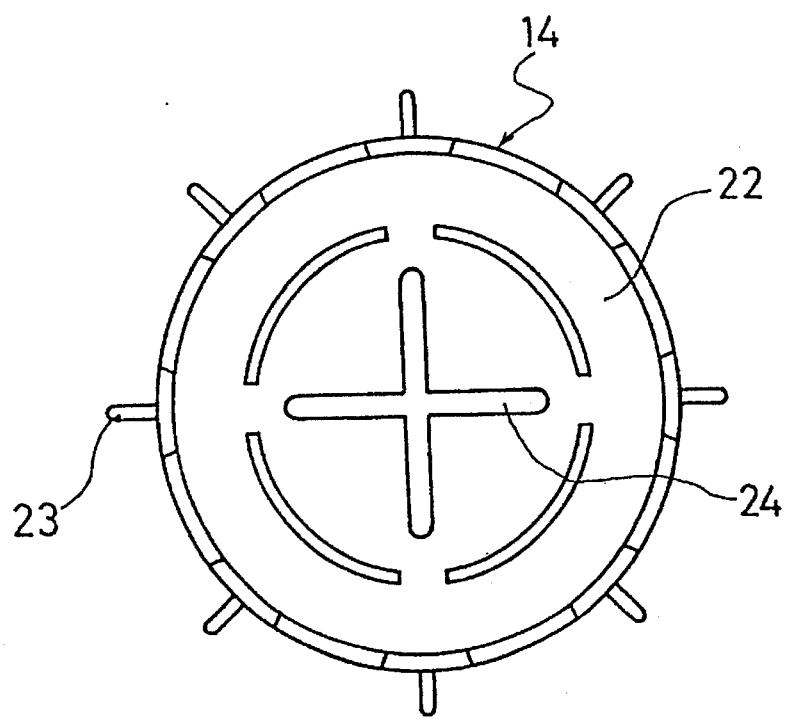
FIG. 6 is a bottom view of the float of FIG. 4.

FIG. 1 is a cross-sectional view of a stop valve according to a first embodiment of the invention, FIG. 2 is a front view of the stop valve of FIG. 1, FIG. 3 is a bottom view of the stop valve of FIG. 1, FIG. 4 is a front view of a float of the stop valve of FIG. 1, FIG. 5 is a plan view of the float of FIG. 4 and FIG. 6 is a bottom view of the float of FIG. 4.

A stop valve of the first embodiment includes a case 12 having a valve seat 11, a float 14 which is provided in the case 12 so as to move vertically and has a valve body 13 at the upper surface thereof, and a pedestal 16 provided under the case 12 for placing a spherical weight 15 thereon.

The case 12 is cylindrical and has openings 17, through which evaporative emission flows, on a side wall 12A thereof. A plurality of slits 18, through which the evaporative emission passes are defined on the side wall 12A above the openings 17. Since the width of each slit is narrow, the evaporative emission flows easily but fuel hardly sprays. There are defined engaging ports 20 in which engaging projections 19 of a pedestal 16, described later are engaged. A valve port 12C is defined on an upper surface 12B of the case 12 and a periphery of the valve port 12C forms a valve seat 11.

The pedestal 16 is circular in its outer periphery. A plurality of engaging projections 19, which extend radially, are provided at the outer peripheral edge of the pedestal 16. The center of the pedestal 16 is recessed and directed downward so that the weight 15 is always positioned at the center of the pedestal 16. Slits 21 are provided on the pedestal 16 so as to extend radially from the center thereof to the outside. The thickness of the pedestal 16 is gradually thinned toward the center of the pedestal 16.

The float 14 is inversely cup-shaped and a lower opening thereof is closed by a cap 22. A valve body 13 formed of an elastic body made of rubber or soft synthetic resin, etc. is provided at the center of the upper surface 14A of the float 14. The valve body 13 has an umbrella shape. A leg of the valve body 13 penetrates the upper surface 14A of the float 14 and is fixed to the float 14. The valve body 13 is attached to the float 14 with leaving a gap H at the rear side of the valve body 13, i.e. between the rear surface of the valve body 13 and the upper surface of the float 14. A plurality of ribs 23 extending outward is formed vertically at the outer peripheral surface of the float 14. Slits 24 are formed on the cap 22 so as to extend from the center of the cap 22 to the outside of the float 14.

An operation of the stop valve having the aforementioned arrangement will be now described with reference to FIG. 7.

Figure 7A:
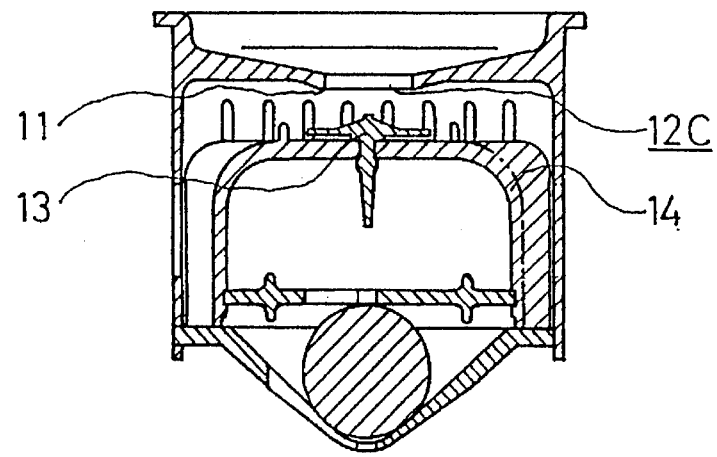

In a normal state, as shown in FIG. 7(A), since the float 14 is positioned at the lower portion of the case 12 and the valve body 13 is not seated on the valve seat 11, the valve port 12C is open. Accordingly, the fuel tank communicates with the atmosphere through the valve port 12C and a canister (not shown).

Figure 7B:
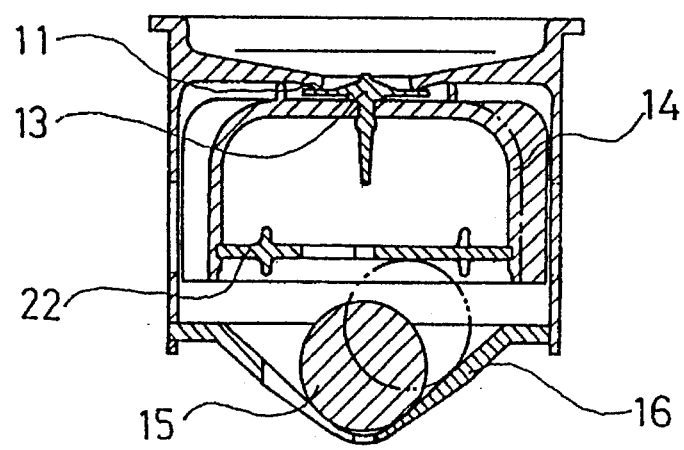

When the fuel tank is inclined so that the liquid surface of fuel is increased, the float 14 floats as shown in FIG. 7(B) so that the valve body 13 closes the valve seat 11. Accordingly, the fuel is prevented from being leaked out.

Figure 7C:
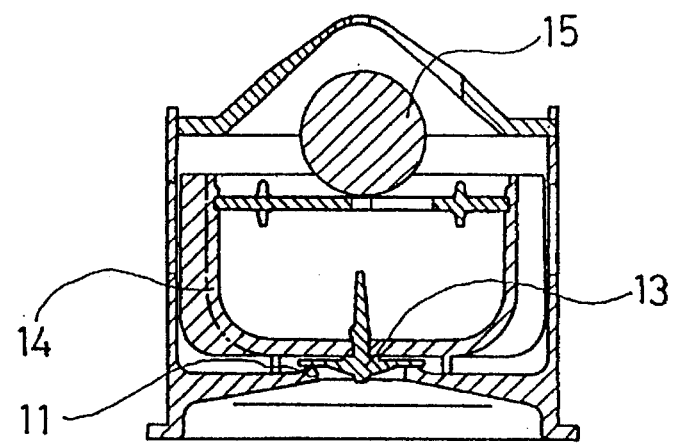

When the automobile overturns, the weight 15 sinks the float 14 so that the valve body 13 closes the valve seat 11 as shown in FIG. 7(C). Accordingly, the fuel is prevented from being leaked out. Further, even if the weight 15 swings vertically and horizontally to strike against the pedestal 16 or cap 22 to thereby generate striking or shock sound, the shock sound can be reduced by the slits 21 and 24 provided on the pedestal 16 and cap 22.

Since the center of the pedestal 16 is deep, large shock is applied thereto. However, since the thickness of the pedestal 16 is thinned toward the center thereof, the shock is weakened by elasticity of the pedestal 16 at the center thereof, thereby reducing the noise caused by the shock.

Figure 8:
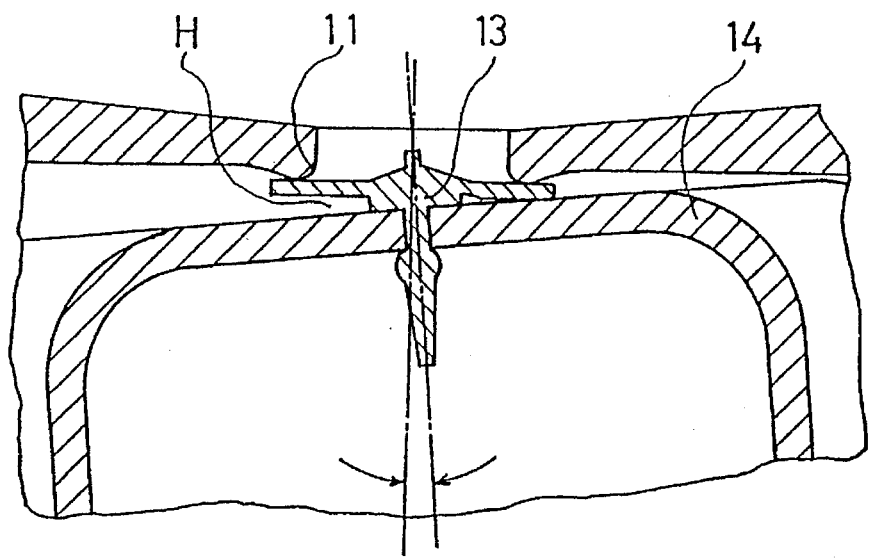
FIG. 8 is a view showing relation between a valve body and a valve seat wherein the form closes the latter when the float of FIG. 4 is inclined.

Even if the float 14 is inclined and moves upward so that the valve body 13 closes the valve seat 11 as shown in FIG. 8, the valve body 13 can be bent by the length of the gap H since there is provided the gap H at the rear side of the valve body 13. As a result, the valve body 13 contact the entire periphery of the valve seat 11, which prevents the valve seat 11 from being inferiorly closed by the valve body 13.

The first embodiment is not limited to the structure as set forth above. For example, the thickness of the pedestal may be the same.

Figure 9:
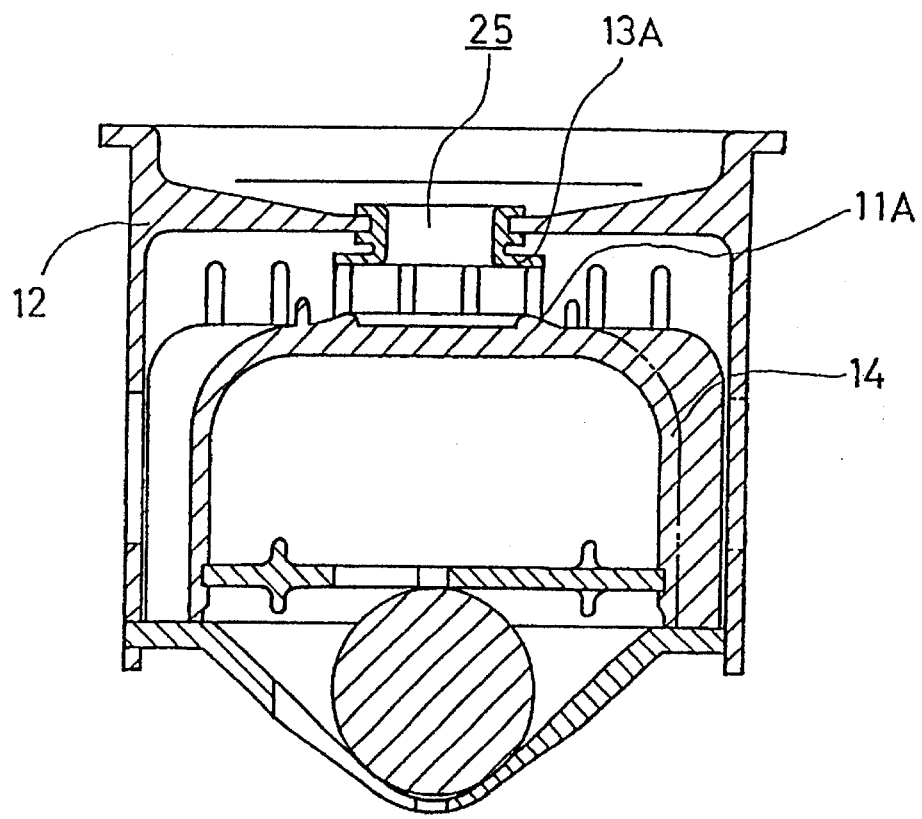
FIG. 9 is a cross-sectional view of a valve body and a valve seat according to a second embodiment of the invention.
Figure 10:
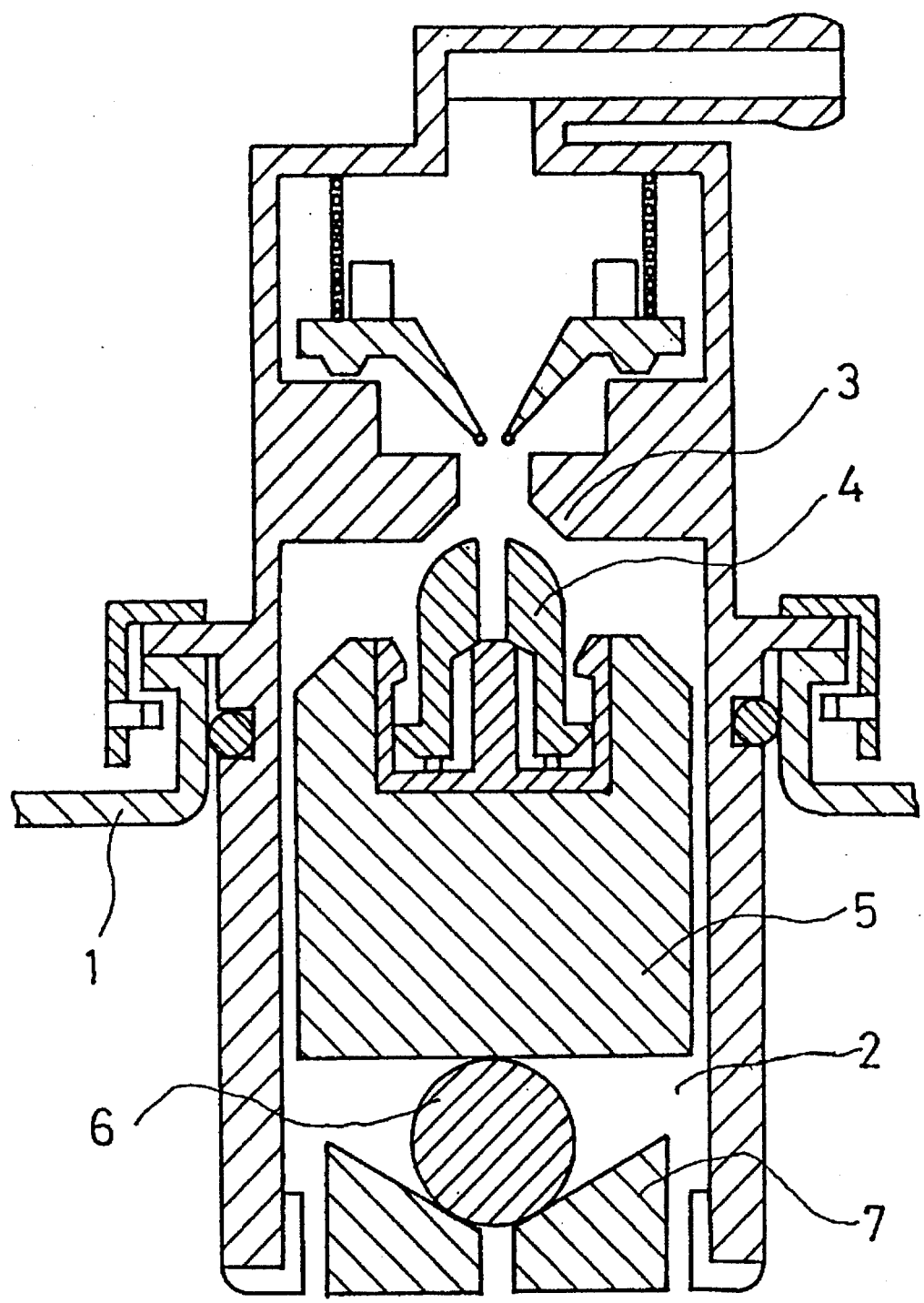
FIG. 10 is a cross-sectional view of a prior art stop valve.

Second Embodiment (FIG. 9)

A stop valve according to a second embodiment will be described with reference to FIG. 9. A valve seat 11A is provided at the side of the float 14 and a valve body 13A may be attached to a case 12. In this case, the valve body 13A is provided with a valve port 25.

Further, the material of the parts of the stop valve is not limited to the one as mentioned above. For example, the pedestal and cap may be made of a material for receiving low shock such as polyacetale. In such a case, the noise caused by the shock can be more reduced.

The present invention is not limited to the aforementioned first and second embodiments but includes all the modified examples without departing from the scope of the invention.

With the arrangement of the stop valve according to the first and second embodiments, there are following advantages.

Since there are provided the slits on the pedestal and cap, the noise caused by the striking of the weight can be reduced.

Since the thickness of the pedestal is gradually thinned toward the center of the pedestal, the noise caused by the striking of the weight can be more reduced.

Since there is provided the gap at the rear side of the valve body, the valve body can surely close the valve seat even if the float is inclined and rises upward.

Since the evaporative emission flows through the slits provided inside the case, the fuel does not spray even if the liquid level of fuel is increased.

What is claimed is:

1. A stop valve comprising:

a case;

a float provided in said case so as to move vertically, wherein a valve seat is closed by a valve body when said float moves upward while said valve seat is open when said float moves downward; and a pedestal provided under said case for placing a spherical weight thereon;

characterized in that said pedestal has radial slits thereon and said float has radial slits at the bottom wall thereof.

2. A stop valve according to claim 1, wherein thickness of said pedestal is gradually thinned toward a center of said pedestal.

* * * * *